Nov. 30, 1965     J. I. BERESIC     3,220,499

AGGREGATE CONSOLIDATING AND SACKING MACHINE

Original Filed July 2, 1962     2 Sheets-Sheet 1

INVENTOR.
JOHN I. BERESIC.
BY
*William S. Brown*
ATTORNEY

Nov. 30, 1965  J. I. BERESIC  3,220,499
AGGREGATE CONSOLIDATING AND SACKING MACHINE
Original Filed July 2, 1962  2 Sheets-Sheet 2

INVENTOR.
JOHN I. BERESIC.
BY
ATTORNEY.

United States Patent Office 3,220,499
Patented Nov. 30, 1965

3,220,499
AGGREGATE CONSOLIDATING AND
SACKING MACHINE
John I. Beresic, 2502 E. Osborn Road, Phoenix, Ariz.
Substituted for abandoned application Ser. No. 207,113,
July 2, 1962. This application Jan. 25, 1965, Ser. No.
427,661
2 Claims. (Cl. 177—62)

This invention pertains to an aggregate consolidating and sacking machine and particularly to an apparatus for regulating the proportions of the materials in a mixture thereof.

This is a substitute application of application Serial No. 207,113 filed July 2, 1962, now abandoned.

One of the objects of this invention is to provide an apparatus for automatically mixing materials in desired proportions automatically and in a highly accurate manner.

Another object of this invention is to provide an apparatus which includes proportioning means for mixing variable proportions of the materials together to obtain a mixture thereof.

A further object of this invention is to provide an automatic weighed quantity bag filling apparatus particularly adapted to the bagging of a predetermined quantity of aggregate materials.

Still another object of this invention is to provide an aggregate consolidating and sacking machine having a specially arranged electric and pneumatic circuitry for automatically performing the function of the machine with a minimum of skill and care required of the operator.

Further features and advantages of this invention will appear from a detailed description of the drawings in which.

Figure 1:
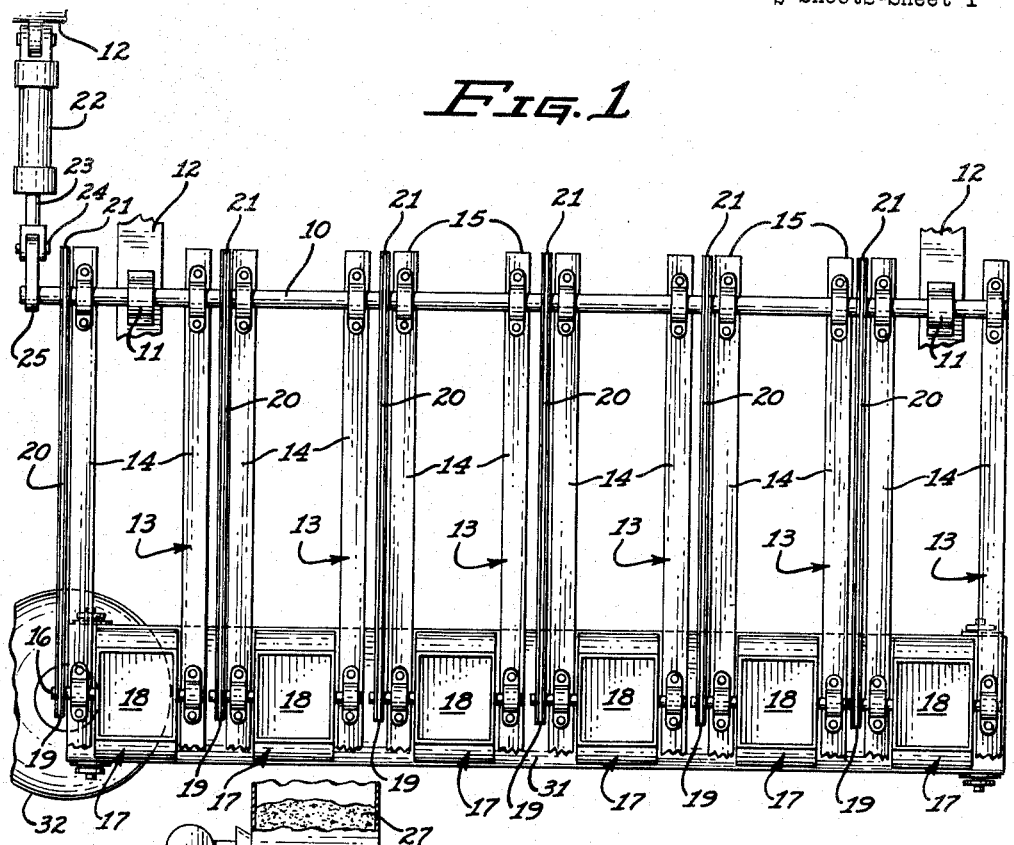
FIG. 1 is a plan view of an aggregate consolidating and sacking machine incorporating the features of this invention.
Figure 2:
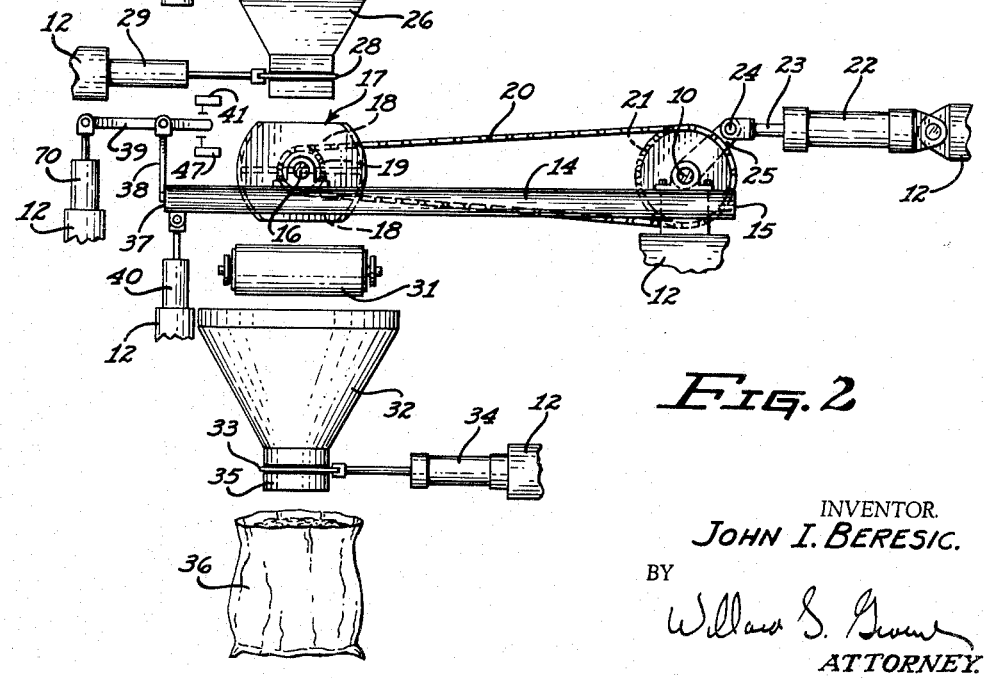
FIG. 2 is an end elevation of the apparatus shown in FIG. 1.

As an example of one embodiment of this invention, there is shown a machine comprising a rockshaft 10 journaled in bearings 11 supported in a suitable frame 12. A series of weighing dump units 13, each comprising a pair of beams 14 having their inner ends 15 pivotally mounted to rock about the axis of the rockshaft 10. Fixed to a bucket shaft 16 journaled on the beams 14 near their outer ends is a tipping bucket material receiving and dumping unit 17 having two diametrically separated compartments 18. A sprocket 19 is fixed to the shaft 16 and is connected by a chain 20 to a sprocket wheel 21 fixed on the rockshaft 10. An air or fluid pressure operated cylinder 22 suitably fixed to the frame 12 has a piston rod 23, the outer end of which is pivotally connected at 24 to the outer end of the actuating arm 25 fixed to the rockshaft 10. By this arrangement appropriately energizing the cylinder 22 causes the tipping bucket unit 17 to rock through 180 degrees of rotation in one direction or the other to bring either of the tipping bucket compartments to 18 to receiving position while the other compartment 18 is turned down to dumping position.

Above each of the tipping bucket units 17 is a supply hopper 26 each containing a supply of a different kind of material 27 to be proportioned and mixed as desired with the material 27 in the other supply hoppers 26. Suitable control gates 28 operated by solenoids 29 are provided along with appropriate vibrators 30, to feed material to the compartment 18 of the tipping bucket units 17. Below all of the tipping bucket units 17 is a suitable continuously running conveyor belt 31 discharging into a dry mixer 32 having a suitable control gate 33 in the bottom thereof operated by a fluid pressure cylinder 34 controlled by the usual timer, not shown. The bags 36 to be filled with the desired aggregate mixture are placed under the discharge end 35 of the dry mixer 32.

The front ends 37 of the beams 14 are connected by a link 38 to an appropriate weighing scale beam 39 adjustable for the desired load placed in the tipping units 17. A suitable dashpot damper 40 carried on the frame 12 may be utilized to stabilize the beam 14 as material is dumped from the hopper 26 into the tipping bucket unit 17.

Figure 3:
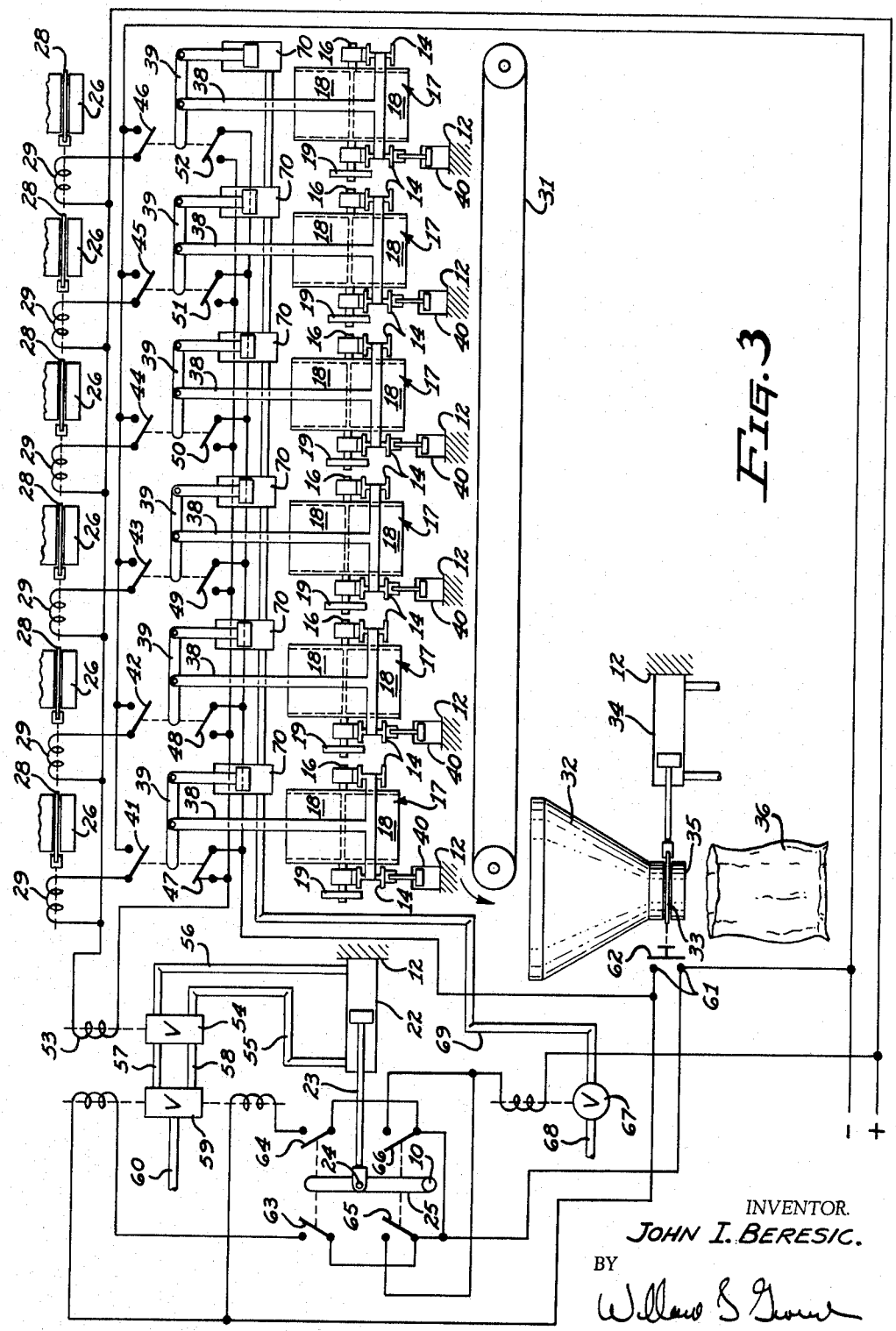
FIG. 3 is an electric and pneumatic circuit diagram of the operating and control apparatus of the machine.

Referring particularly to FIG. 3, when the tipping bucket units 17 are empty, the weighing and dumping units 13 are in upwardly swung position on the scale beams 39 at which time upper limit switches contacts 41, 42, 43, 44, 45, and 46 are closed so as to energize solenoids 29 opening gates 28 of the supply hoppers 26 to dump the respective materials into the upturned compartment 18 of the respective tipping bucket unit 17.

As each of the tipping bucket units become filled with the required amount of material in accordance with the setting of its scale beam 39 contacts 41–46 open and lower limit switch contacts 47, 48, 49, 50, 51 and 52 close. When scales 39 are all satisfied, limit switches 47–52 are all closed to complete the circuit to energize the coil 53 of normally closed valve 54 so as to interconnect supply pipes 55 and 56 with pipes 57 and 58 connected to the two-way reversing valve 59 connected to an air supply pipe 60. The two-way reversing valve 59 is arranged to stay in one position until energized to rock and dump the tipping bucket units 17 when normally open switch contacts 61 of limit switch 62 is closed upon closing of the control gate 33 of the mixer 32 by the cylinder 34. Under these conditions current passes through limit switch 63 or 64, one or the other of which are closed by the lever 25 conencted to the cylinder 22 at the ends of its stroke in tipping the bucket unit 17. The cylinder 22 is thus energized through the valve 59 to tip and dump the unit 17 by 180° rotations thereof.

When the cylinder 22 starts, noramlly open limit switch 65 or 66 closes to energize solenoid valve 67 to connected air supply from pipe line 68 to air pipe line 69 connected to the lock out cylinders 70 which hold the scale beams in satisfied position until the dump operation of the units 17 is complete. The reversing valve 59 selects the direction the cylinder 22 is to move. The valve 54, when de-energized, blocks lines 57 and 58 to keep air from energizing the cylinder 22 untill all scales are satisfied, the valve 54 being required because the limit switch 62 is of momentary contact operation.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

What is claimed is:

1. An aggregate consolidating and sacking machine comprising in combination:
    (A) a plurality of weighing and dumping units each including,
    (B) a tipping bucket unit,
    (C) power means for individually dumping each of said tipping bucket units,
    (D) scales for each of said weighing and dumping units responsive to the load placed in said tipping bucket units, (E) a common continuously operating conveyor belt adapted to receive discharge from said tipping bucket units,
(F) a dry mixer adapted to receive discharge from said conveyor belt,
(G) a supply hopper for each of said tipping bucket units,
(H) control means responsive to simultaneously energize said power means when all of said scales are actuated to satisfied position by the loads in said tipping bucket units,
(I) a control gate on said dry mixer,
(J) a momentary contact limit switch actuated by the movement of said gate to closed position,
(K) a control valve operable by said momentary contact limit switch to energize said power means for dumping said tipping bucket units,
(L) control limit switch means operable by said weighing and dumping units when said tipping bucket units are empty to denergize said power means for individually dumping each of said tipping bucket units,
(M) and further limit switch means actuated by said power means for dumping said tipping bucket units to determine the direction of operation of said power means.

2. An aggregate consolidating and sacking machine comprising in combination:
(A) a frame,
(B) a rockshaft journaled in said frame,
(C) a series of weighing dump units each comprising,
(D) a pair of beams having their inner ends pivotally mounted to rock about the axis of said rockshaft,
(E) a bucket shaft journaled on the outer ends of each pair of beams,
(F) a tipping bucket material receiving and dumping unit fixed to said bucket shaft,
(G) two diametrically separated compartments in each tipping bucket unit,
(H) a sprocket fixed to said bucket shaft,
(I) a sprocket wheel fixed on said rockshaft,
(J) a chain operatively connected over said sprockets,
(K) a power operated device connected between said frame and said rockshaft to actuate said rockshaft to cause said tipping bucket to rock through 180 degrees of rotation about a horizontal axis in one direction or the other to bring either of said compartments to receiving position while the other compartment is turned down to dumping position,
(L) a supply hopper on said frame above each of said tipping bucket units,
(M) a power actuated control gate for each of said hoppers,
(N) a continuously running conveyor belt on said frame located below all of said tipping bucket units,
(O) a dry mixer on said frame positioned to receive discharge from said conveyor belt,
(P) a power actuated control gate on the bottom of said dry mixer,
(Q) amomentary contact limit switch actuated by the movement of said gate to closed position,
(R) a control valve operable by said momentary contact limit switch to energize said power means for dumping said tipping bucket units,
(S) control limit switch means operable by said weighing and dumping units when said tipping bucket units are empty to denergize said power means for individually dumping each of said tipping bucket units,
(T) and further limit switch means actuated by said power means for dumping said tipping bucket units to determine the direction of operation of said power means.

References Cited by the Examiner
UNITED STATES PATENTS

| | | | |
|---|---|---|---|
| 1,733,225 | 10/1929 | Howe | 177—80 |
| 1,971,807 | 8/1934 | Bates et al. | 177—84 |
| 2,727,733 | 12/1955 | Carswell | 17—80 X |
| 2,823,005 | 2/1958 | Lindars | 177—84 X |
| 2,863,651 | 12/1958 | McBride | 177—70 X |

LEO SMILOW, *Primary Examiner.*